(12) United States Patent  (10) Patent No.: US 8,043,132 B1
Wyant  (45) Date of Patent: Oct. 25, 2011

(54) METHOD FOR OPERATING A PROPULSION SYSTEM OF A WATERCRAFT

(75) Inventor: John W. Wyant, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 284 days.

(21) Appl. No.: 12/551,933

(22) Filed: Sep. 1, 2009

(51) Int. Cl.
*B63H 21/22* (2006.01)

(52) U.S. Cl. .......................................... 440/1
(58) Field of Classification Search ........... 440/1
See application file for complete search history.

(56) References Cited

U.S. PATENT DOCUMENTS

| | | | |
|---|---|---|---|
| 3,270,267 A * | 8/1966 | Nolte, Jr. .................. | 320/138 |
| 3,898,547 A | 8/1975 | Poole | |
| 5,206,578 A | 4/1993 | Nor | |
| 5,220,268 A | 6/1993 | Rose et al. | |
| 5,344,330 A * | 9/1994 | Hoffman .................. | 439/138 |
| 5,757,595 A | 5/1998 | Ozawa et al. | |
| 5,921,799 A | 7/1999 | Forrester | |
| 5,937,781 A | 8/1999 | Isella et al. | |
| 5,965,997 A | 10/1999 | Alwardi et al. | |
| 6,035,796 A * | 3/2000 | Vowels ..................... | 114/248 |
| 6,057,667 A | 5/2000 | Mills | |
| 6,203,355 B1 | 3/2001 | Neblett et al. | |
| 6,380,637 B1 * | 4/2002 | Hsu et al. ................ | 290/1 R |
| 6,645,017 B1 * | 11/2003 | Skrzypek et al. ........ | 440/6 |
| 6,652,330 B1 | 11/2003 | Wasilewski | |
| 6,802,749 B1 | 10/2004 | Justus | |
| 6,834,688 B2 | 12/2004 | Ono et al. | |
| 6,857,917 B1 * | 2/2005 | Wasilewski .............. | 440/1 |
| 6,905,362 B2 * | 6/2005 | Williams .................. | 439/490 |
| 6,964,821 B2 | 11/2005 | Hirakata | |
| 7,089,876 B2 * | 8/2006 | Porat ........................ | 114/222 |
| 7,205,747 B2 | 4/2007 | Wu | |
| 7,218,118 B1 | 5/2007 | Gonring | |
| 7,410,395 B2 * | 8/2008 | Kawai et al. ............. | 440/6 |
| 2009/0057041 A1 | 3/2009 | Kamaga | |

FOREIGN PATENT DOCUMENTS

| | | |
|---|---|---|
| JP | 07-039012 | 2/1995 |
| JP | 07-115710 | 5/1995 |
| JP | 09-154236 | 6/1997 |
| JP | 09-322313 | 12/1997 |

* cited by examiner

*Primary Examiner* — Stephen Avila
(74) *Attorney, Agent, or Firm* — William D. Lanyi

(57) ABSTRACT

A hybrid marine vessel is provided with a system that inhibits the movement of the marine vessel under its own power when the marine vessel is connected or recharging to a stationary source of energy on shore. This avoids significant damage that could otherwise occur if the marine vessel moves away or attempts to move away from the dock when connected by a cable or other device to a stationary structure. The system detects a potential connection between the boat and a stationary shore component, such as a source of energy, and inhibits the transmission from being placed in a forward or reverse gear position under those conditions. Similarly, if the boat is already in a forward or reverse gear position, the system inhibits its being placed into a battery recharging mode.

20 Claims, 6 Drawing Sheets

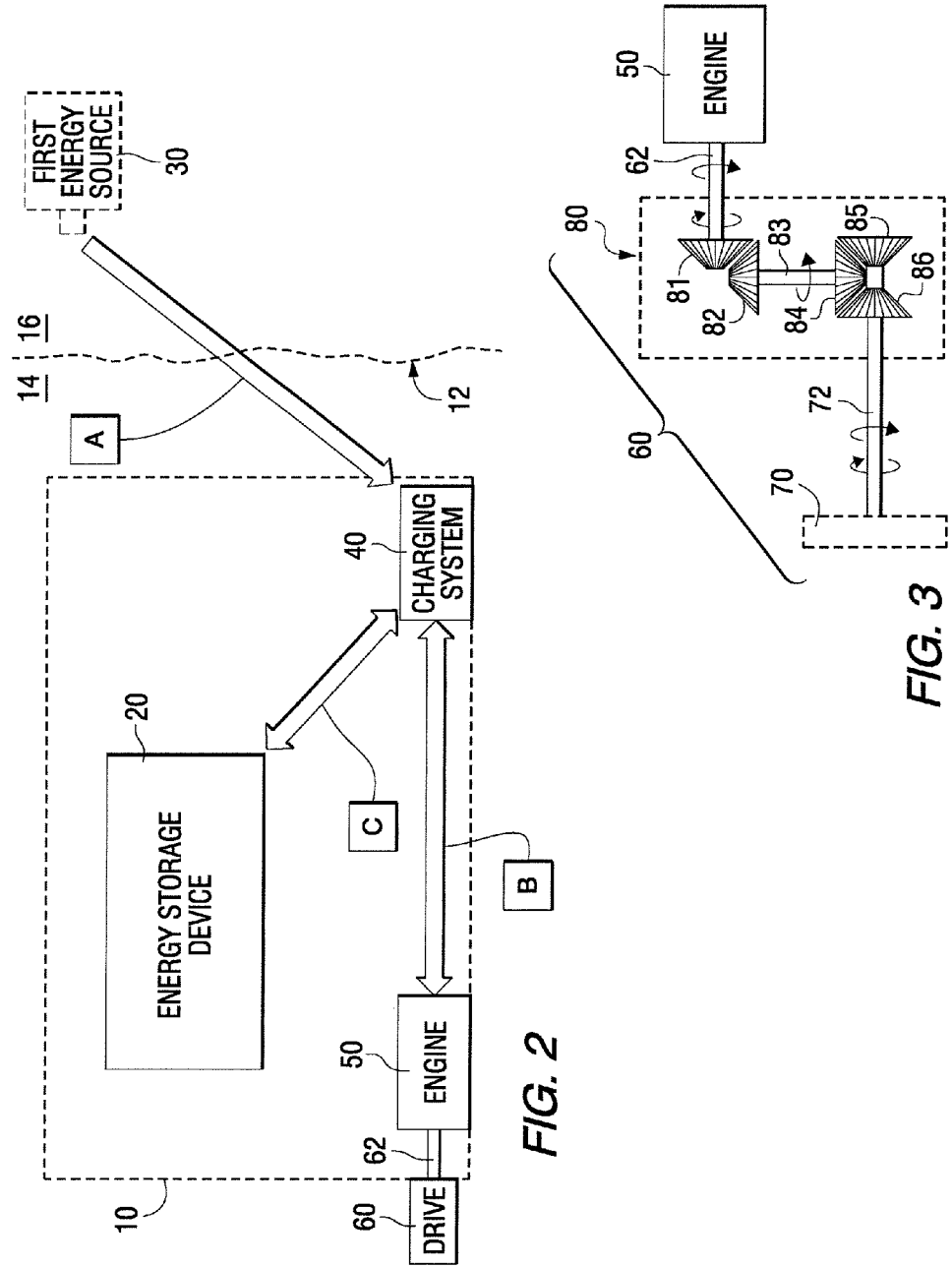

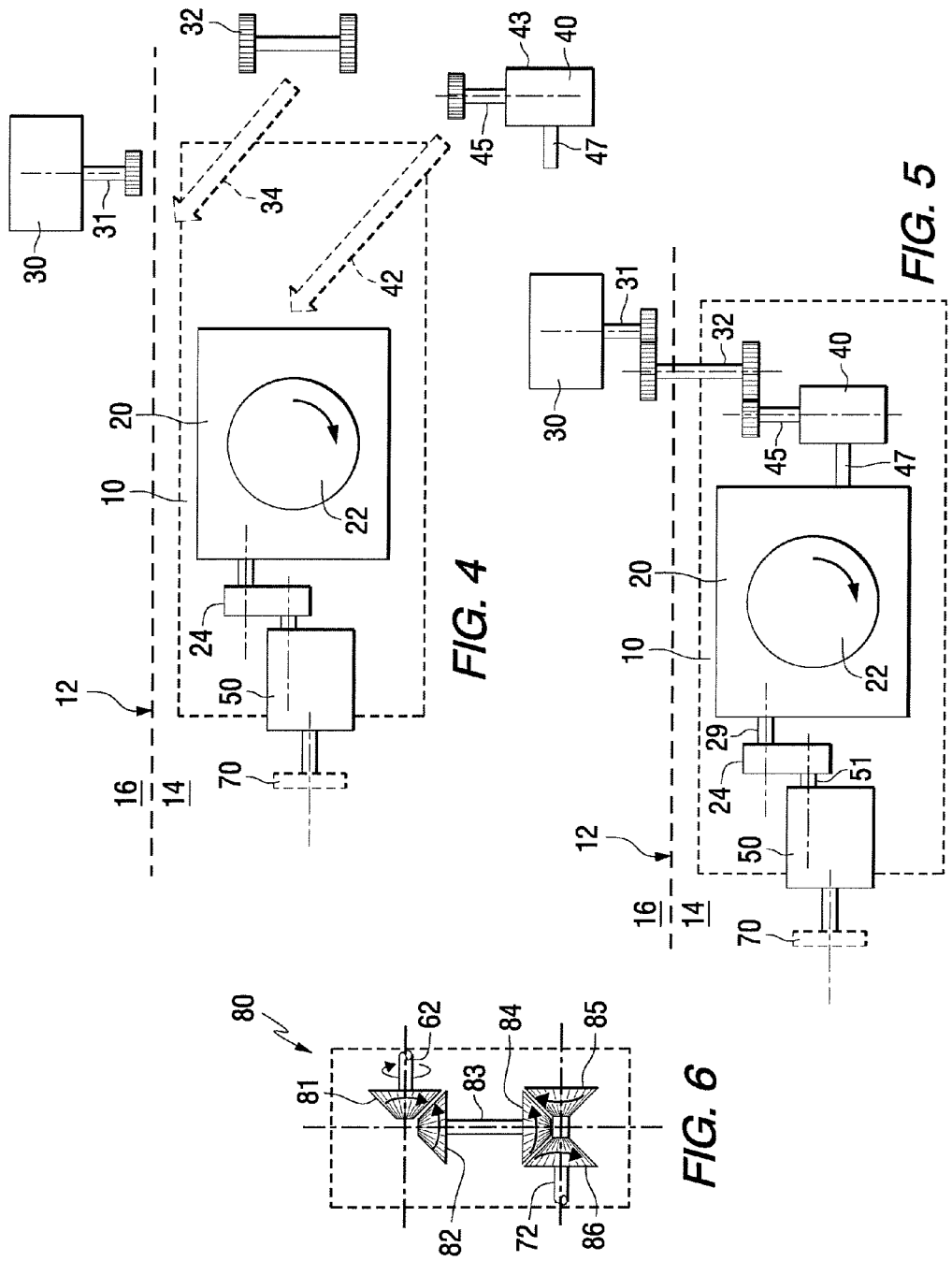

|  | TRANSMISSION IN NEUTRAL | TRANSMISSION IN FORWARD GEAR | TRANSMISSION IN REVERSE GEAR |
|---|---|---|---|
| ENGINE OFF | PERMITTED | PERMITTED | PERMITTED |
| ENGINE ON | PERMITTED | PROHIBITED | PROHIBITED |

*FIG. 8*

|  | TRANSMISSION IN NEUTRAL | TRANSMISSION IN FORWARD GEAR | TRANSMISSION IN REVERSE GEAR |
|---|---|---|---|
| ENGINE OFF | PERMITTED | PROHIBITED | PROHIBITED |
| ENGINE ON | PERMITTED | PROHIBITED | PROHIBITED |

*FIG. 9*

METHOD FOR OPERATING A PROPULSION SYSTEM OF A WATERCRAFT

BACKGROUND OF THE INVENTION

1. Field of the Invention

The present invention is generally related to a method for operating a propulsion system of a watercraft and, more particularly, to a technique for controlling the relationship between the connecting and disconnecting of an energy recharging system for the watercraft and how that system interrelates with the control of various components on the watercraft that allow it to move in response to changes in the condition of its transmission and changes in the operating status of its engine.

2. Description of the Related Art

The basic problem toward which the preferred embodiments of the present invention are directed is the avoidance of accidents that can occur if a watercraft is moved relative to a dock while it is physically connected to a recharging system. At a minimum, some connective device can be severely damaged. Since the recharging of the energy storage components (e.g. flywheel, fuel tanks, capacitors, rechargeable batteries) requires some physical interconnection between an onshore energy source and a mechanism on a watercraft and, in turn, between the mechanism and the energy storage device on the watercraft requires a physical connection that is relatively sturdy, movement away from the dock or marina will tear or destroy the energy transfer connection device or the components to which it was attached. The basic cause of this damage can be identified very simply. It is the simultaneous occurrence of two situations. One situation is the movement or potentially imminent movement of the marine vessel. The other situation is the recharging operation or imminent beginning of a recharging operation or the continued attachment of an energy transfer device after the completion of a recharging operation. Stated even more simply, if the watercraft is connected to some stationary device on shore and the marine vessel is able to move relative to the dock, very serious problems can occur and significant damage is likely to result. Most systems developed to date have relied on some type of switch which represents the position of a component, such as a door covering an electric socket on a car. Some of the known devices which address this issue are described below.

U.S. Pat. No. 3,898,547, which issued to Poole on Aug. 5, 1975, describes an electric vehicle charger shutoff interlock system. It prevents a vehicle from being driven while the batteries are being charged and prevents activation of the charger until the direct current connection of the battery charger to the electric vehicle is completed. This is accomplished by using standard, low cost readily available solenoid relay switches and a three point connector and plug assembly. Two of the points of the connector and plug assembly provide direct current connection to the batteries of the electric vehicle. The third contact completes a series circuit through two relays one of which is located on the electric vehicle to prevent operation of the vehicle when activated, and the other relay which is connected to permit energization of the battery charger when activated.

U.S. Pat. No. 5,206,578, which issued to Nor on Apr. 27, 1993, describes a monitoring system for batteries during charge and discharge. The batteries are monitored while they are being charged or discharged, where the batteries comprise a series of modules or cells that are connected in series. A terminal is placed between each adjacent pair of modules and at each end of the battery, so that voltage across each module may be measured at the pair of terminals that define the module.

U.S. Pat. No. 5,220,268, which issued to Rose et al. on Jun. 15, 1993, describes a battery charging system and connection apparatus therefore. Connectors are adapted for mating in electrical contact. A bracket is provided for mounting the first connector to the vehicle. The second connector is mounted on the digital end of cables leading from the battery charger. The apparatus also includes a switch for interrupting the electrical circuit between the battery and the drive motor prior to mating of the first and second connectors. The invention also relates to a battery charging system incorporating a battery charger, a charger receptacle mounted on the vehicle and a plug for operatively connecting the battery charger to the charger receptacle.

U.S. Pat. No. 5,344,330, which issued to Hoffman on Sep. 6, 1994, describes an electrical connector assembly, especially for an electric vehicle. The electrical connector assembly includes a male connector or plug with electrical contacts and a female electrical connector or receptacle with mating electrical contacts. Both the receptacle and the plug have a cover for selectively covering and uncovering its electrical contacts to prevent inadvertent contact with the electrical contacts and to protect the electrical contacts from the environment. In the preferred embodiment, the covers of the plug and receptacle are automatically uncovered and the receptacle contacts are moved transversely to the plug insertion direction and into contact with the plug female contacts only after full insertion of the plug into the receptacle. The plug can be inserted into the receptacle with little or no force by the user since the contacts of the plug and receptacle are not electrically coupled together until after full insertion of the plug into the receptacle.

Japanese patent application 05-278871, which was filed on Oct. 13, 1993, describes an interlock apparatus of a vehicle carried charger. A vehicle carried charger charges a vehicle carried battery by connecting a charging cable in external power supply to a charging plug receptacle of a charger accommodated in a charging box providing a cover which can be opened or closed freely. An interlock switch for detecting opening or closing condition of the cover is provided near the cover and this interlock switch is connected to a key switch circuit. Thereby, when the cover is closed the interlock is released.

Japanese patent application 05-181796, which was filed on Jul. 23, 1993, describes a control device for an electric vehicle. It makes a connector connection detecting signal from a detection switch for a charging connector valid when a vehicle velocity signal is in a vehicle stop state, it turns off a relay by a relay control signal, and it cuts off electrification of a motor.

Japanese patent application 07-333934, which was filed on Nov. 28, 1995, describes a power supply unit for an electric car. A switch movable contact of a charging terminal cover switch comes to one position when the charging terminal block of a connector is closed and comes to another position when the charging terminal cover is open.

Japanese patent application 08-140450, which was filed on Jun. 3, 1996, describes an electric motor car. The car is equipped with a casing for charge connection which has a built-in connector where the output terminal of a charger to charge a storage battery for driving itself is to be connected and which is selectively covered by a charge lid, the casing for connector is opened to enable it to charge by exciting a charge lid solenoid when a charge lid open request is made by a charge lid open request switch and besides the mobile contact of a shift position detection switch is in contact with the parking position contact.

U.S. Pat. No. 5,757,595, which issued to Ozawa et al. on May 26, 1998, describes an apparatus for displaying battery charging of an electric vehicle. An apparatus for displaying the charging of the battery of an electric vehicle has a charging connector mounted on an outer panel of a vehicle body of the electric vehicle, a lid openly mounted on the panel in covering relation to the charging connector and a cavity defined in the outer panel, and a display panel disposed in the cavity for displaying a period of time required until the battery is fully charged and/or a charged capacity of the battery is exceeded. The driver of the electric vehicle can easily recognize the remaining time required until the battery is fully charged and a percentage of the fully charged capacity of the battery to which the battery is presently charged, from outside of the electric vehicle.

U.S. Pat. No. 5,921,799, which issued to Forrester on Jul. 13, 1999, describes an electrical receptacle with releasable locking mechanism. A body formed from upper and lower body portions encloses line and neutral contact assemblies and a ground contact assembly. The line and neutral contact assemblies carry a latching mechanism which releasably and automatically engages the holes in the line and neutral prongs of a standard electrical plug. A collar, carried by the body slides between a forward position and a rearward position. The collar is biased to the forward position.

U.S. Pat. No. 5,937,781, which issued to Isella et al. on Aug. 17, 1999, describes as floating piling attachment device with shock absorbing capability. A watercraft mooring device is described which permits the watercraft to rise and drop vertically with the water level and which provides both direct shock absorption between the watercraft and the fixed mooring point, such as the pier or piling, and protection against scraping between the watercraft and the fixed mooring point. A floating tube is provided, which is designed to loosely fit over and around the fixed mooring point and which provides one or more attachment grooves for holding an attachment rope, cord or cable in place.

U.S. Pat. No. 5,965,997, which issued to Alwardi et al. on Oct. 12, 1999, describes a battery monitoring circuit with storage of charge and discharge accumulation values accessible therefrom. The monitor circuit is operable to be connected to an external CPU or similar system through a single wire communication port for transferring information back and forth. There is also provided an external signal on a line for indicating charge or discharge activity in the monitoring circuit. The monitor circuit is operable to collect information regarding the amount of charge input to the battery and the length of time that the charge is input to the battery and also the amount of charge that is removed from the battery and the length of time that the charge is removed.

U.S. Pat. No. 6,057,667, which issued to Mills on May 2, 2000, describes a booster with switch actuated cable decoupler. It is provided for applying electrical power to a device in which a power source having positive and negative terminals is disposed in a housing, with electrical cables extending from their respective positive and negative or grounded terminals to exterior of the housing, with an electrical switch interposed in one of the electrical cables interior of the housing manually actuable from outside of the housing, with an electrical circuit operatively coupled to one of the cables and the electrical switch, whereby the electrical circuit effects automatic closing of an electrical switch upon imposition of a predetermined minimum voltage to the cables, and effects opening of the electrical switch upon the second cable having a voltage less than the predetermined minimum voltage, and with a voltage comparator and its associated circuitry to indicate a level of charge for the power source.

U.S. Pat. No. 6,203,355, which issued to Neblett et al. on Mar. 20, 2001, described a universal charge port connector for electric vehicles. A connector assembly has a male and female connector. The male connector has a housing with electrical contacts to conduct AC or DC current. The female connector also includes a housing to couple with the male housing. The female housing includes electrical contacts to electrically couple with male electrical contacts. A latch mechanism is associated with the male or female connector housing to releasably couple the male and female connectors together.

U.S. Pat. No. 6,652,330, which issued to Wasilewski on Nov. 25, 2003, discloses a storage battery monitoring system with automatic electrical load shedding. A method for controlling the electrical system of a marine vessel comprises the steps of measuring a battery potential, comparing the battery potential to a threshold voltage magnitude, and then disconnecting one or more of a plurality of electrical power consuming devices when the voltage potential is less than the threshold voltage magnitude. This is done to avoid the deleterious condition wherein an engine of the marine vessel is operating at idle speed and attempting to charge the battery while a plurality of electrical power consuming devices are operating and drawing sufficient current from the alternator to prevent the proper charging of the battery. In these circumstances, the battery potential can actually be depleted as the battery attempts to provide the additional required electrical current for the loads.

U.S. Pat. No. 6,802,749, which issued to Justus on Oct. 12, 2004, is describes a marine vessel trolling and battery recharging system. It includes an electric generator/trolling device having a propeller. The device is electrically coupled to a battery and extendable downwardly from the marine vessel into the water. When electrical power is supplied to the generator/trolling device in a first orientation, the propeller turns and serves as a trolling motor. However, when the generator/trolling device is positioned in a second orientation and the main engine of the marine vessel is powered, the propeller spins freely and serves to recharge the battery of the marine vessel.

U.S. Pat. No. 6,834,688, which issued to Ono et al. on Dec. 28, 2004, describes a fuel gas filling system for a vehicle having a supply section and a fuel lid, which includes an opening operation section to which an opening operation for the fuel lid is applied, an operation wire, which is provided between the opening operation section and the fuel lid, for making the fuel lid respond to the opening operation applied to the opening operation section, and a locking device having a movable element, a fixed element, a lock pin, and an actuator.

U.S. Pat. No. 6,905,362, which issued to Williams on Jun. 14, 2005, describes an electric vehicle battery rapid charging connector. It includes a connector plug that is attached to an electrical cable at one end that is, in turn, connected to a charging system at the remaining end of the cable. The connector plug is adapted to fit into a mating receptacle that is attached to the electric vehicle. A pair of cavities in the connector plug are adapted to receive any combination of modules that includes switches, lights, or blank filler plugs.

U.S. Pat. No. 6,964,821, which issued to Hirakata on Nov. 15, 2005, describes a fuel cell fuel supply system and a mobile body. An electric vehicle with fuel cells mounted thereon has a fuel tank that stores a fuel therein and a connector receptor that is connected to the fuel tank and is open to the surface of the vehicle body. A connector of a predetermined hydrogen supply device is fitted in and attached to the connector receptor so that a supply of fuel is fed from the hydrogen supply device to the electric vehicle.

U.S. Pat. No. 7,205,747, which issued to Wu on Apr. 17, 2007, describes a system and method for monitoring a charging period in a battery charger. It describes a method and apparatus for disabling a charging counter circuitry within a battery charger. The apparatus includes circuitry connected to a pin associated with the charging counter circuitry of the battery charger, the circuitry receiving a signal from a device connected to the battery charger. The circuitry disables the charging counter circuitry responsive to a signal from the device at a first level and enables the charging counter circuitry responsive to the signal from the device at a second level.

U.S. Pat. No. 7,218,118, which issued to Gonring on May 15, 2007, discloses a method for monitoring a condition of a battery. It provides the measuring of a voltage characteristic of the batter, comparing the voltage characteristic to a preselected threshold value, and a evaluating the condition of the battery as a function of the relative magnitudes of the voltage characteristic and the threshold value. The voltage characteristic of the battery is measured subsequent to a connection event when a connection relationship between the battery and an electrical load is changed. The electrical load is typically a starter motor which is connected in torque transmitting relation with an internal combustion engine. The voltage characteristic is preferably measured at its minimum value during the inrush current episode immediately prior to cranking the internal combustion engine shaft to start the engine.

U.S. Pat. No. 7,410,395, which issued to Kawai et al. on Aug. 12, 2008, describes a parent child type boat with a generator. The boat has an electrical power generating device, such as a fuel cell. The boat includes a parent boat and at least one child boat which is smaller than the parent boat. The parent is boat is equipped with a generating device. The child boat is equipped with a battery and an electric propulsion device. When the child boat is docked with the parent boat and electrically connected thereto, power can be supplied to at least one of the battery and the electric propulsion device of the child boat from the generating device of the parent boat.

U.S. patent application Ser. No. 12/230,675, which was filed on Sep. 3, 2008 by Kamaga, describes an electric powered vehicle chargeable by external power supply. An open/closed detection unit detects whether a lid covering a charge connector is closed or opened and outputs the results of the detection to a vehicle control unit. A connection detection unit receives a first signal and detects whether a plug and the charge connector are connected or not based on the voltage of the first signal. The vehicle control unit determines, based on the result of the detection by the connection detection unit and information about an external power supply indicated by a second signal, whether the first signal is normal. When the first signal is abnormal, the vehicle control unit determines based on the result of detection by the open/close detection unit, whether the lid is closed. When the lid is closed, the vehicle control unit controls the vehicle state to be in the travel-enabled state.

The patents described above are hereby expressly incorporated by reference in the description of the present invention.

Those skilled in the art of marine vessel design are aware of the many functional and structural differences between a watercraft and an automobile or land-based vehicle. One example of these differences is the fact that it is rather easy to construct a recess in the outer surface of an automobile and provide a lid, or door, which makes closure available over the recess where a cable would normally be inserted to connect the automobile to a source of energy, such as electrical power or hydrogen gas. Marine vessels are quite different in that most external surfaces of a boat become significantly wetted or submerged during normal use of the boat. In addition, the visible surfaces that do not become directly submerged or significantly wetted during normal use of the boat are subject to frequent exposure to splashing during normal use of the marine vessels, particularly pleasure craft. Although lids and covers can be provided with seals, maintaining the integrity of the seals over time can be quite difficult, particularly in view of the fact that the seals would be required to protect electrical contacts from contamination with the water in which the watercraft is operated. This water, located at or near the many miles of shoreline of the United States, is very likely to be seawater which is highly conductive and likely to subject the associated circuitry to potentially damaging contact and corrosion. Therefore, providing a switch associated with a lid or cover as described in many of the patents and publications described above is impractical when proposed in conjunction with hybrid marine vessels. This is particularly relevant in view of the severely high voltage magnitudes proposed for use in recently developed hybrid boats. Allowing seawater to migrate into a switch or female receptacle that is expected to then carry 300 volts DC can subject the marine vessel to potential damage.

Due to the limited amount of exposed surface area on a watercraft which is not subject to frequent and significant wetting, it is difficult to identify adequate locations for receptacles where a cable can be plugged into a location on the boat where the receptacle is not likely to be wetted, potentially with saltwater. If an appropriate location is found within the structure of the marine vessel where wetting is unlikely, it can present difficulties in locating the connector and it could require a relatively long cable to reach from that position within the structure of the watercraft and also reach a power source on shore.

It would therefore be significantly beneficial if a methodology could be developed which avoids the need for switches associated with lids that cover the electrical receptacle on the boat while also avoiding the potential simultaneous recharging of batteries while the boat moves relative to an energy source located on shore.

SUMMARY OF THE INVENTION

A method for operating a propulsion system of a watercraft, in accordance with a preferred embodiment of the present invention, comprises the steps of providing an engine having a rotatable crankshaft, providing a propulsion shaft which is configured to support a propulsor for rotation about a generally horizontal propulsion shaft axis, providing a transmission which comprises forward, neutral, and reverse gear positions, disposing the transmission in torque transmitting relation between the crankshaft of the engine and the propulsion shaft, determining a rotation status of the propulsion shaft, providing an energy storage device, providing an energy transfer device which is alternatively placed into first and second states, determining the state of the energy transfer device, and inhibiting the concurrent rotation of the propulsion shaft and placement of the energy transfer device in the first state.

The engine described above typically serves as a primary drive unit for the watercraft and preferred embodiments of the present invention comprise internal combustion engines powered by diesel or gasoline fuel. It should be understood that certain embodiments of the present invention can also use electric motors for these purposes, and therefore fall within the overall definition of an "engine" in this description, but the vast majority of applications of the present invention is expected to comprise gasoline engines or diesel engines. Most preferred embodiments of the present invention comprise a water impervious containment that is configured to provide at least a portion of the watercraft and is shaped to define one or more internal cavities of sufficient total displacement to support the watercraft on a body of water. More specifically, the water impervious containment is typically a shell made of fiberglass or metal and shaped to define a configuration that defines an internal cavity and smooth outer surface which is shaped to provide efficient movement on a body of water. Watercraft have been manufactured in numerous shapes and sizes and the water impervious containment structure usually defines one or more hull members which act as bowls to displace water in a sufficient magnitude to support the watercraft and the various components and people on the watercraft. It should be understood that the shape and size of the water impervious containment is not limiting to the present invention. In a typical application, the total displacement of the water impervious containment is sufficient to provide support for the engine, the transmission, and the energy storage device in addition to the people who are on board and all of the other equipment normally used on a pleasure craft. The engine is typically located in the cavity of the containment which serves as the bilge of the watercraft. The energy storage device is normally located in the space defined by the water impervious containment and is usually also located in the bilge which is within the cavity formed within the structure of the containment.

The plurality of blades is shaped to provide thrust when the propulsor is rotated within water of the body of water. The propulsor, if it is a marine propeller, is typically extended to a position below the surface of the water and sometimes to the rear of the watercraft. If the propulsor is an impeller, it is typically located within a tunnel of a jet drive propulsion system and the water is sometimes directed upwardly from the main body of water through a space in which the impeller rotates and then back down to the body of water, all below the structure of the watercraft. It should be understood that the specific application of the propulsor, as either a propeller or an impeller, is not limiting to the present invention. In addition, several types of watercraft attach the propulsor to the end of the propulsion shaft which extends through an opening in the hull with the engine remaining within a bilge compartment defined by the shape of the water impervious containment. The present invention is applicable to many different types of marine propulsion systems including outboard motors, sterndrive systems, ski boats, and the more recently developed pod-type systems which support a propulsion shaft directly below the hull of the watercraft with the propeller shaft being supported by the pod and provided with torque by a driveshaft which is generally vertical and extends through the hull for rotation about a generally vertical axis. The driveshaft is connected to the crankshaft of the engine which, in turn, is located within the bilge of the watercraft. It should be understood that all of these optional structures are within the scope of the present invention. It should also be understood that, although the term "blades" is sometimes assumed to imply the use of a marine propeller to the exclusion of an impeller of the type that would normally be used in a jet drive, the use of that term in this description does not limit the application of the present invention to combinations with marine propellers and conventional blades. Instead, the term "blades" is meant to include any type of rotating propulsion shaft that causes a plurality of appendages, or one continuous appendage, shaped to rotate through a liquid medium and, as a result, create a thrust that can be used to propel the watercraft.

The propulsor, in a preferred embodiment of the present invention, comprises a plurality of blades which are configured to provide thrust which is parallel to the propulsion shaft axis in response to rotation of the propulsor about the propulsion shaft axis. In a particularly preferred embodiment of the present invention, the propulsor is a marine propeller device or a marine impeller device. The thrust provided by the plurality of blades is exerted in a direction that is parallel to the axis of the propulsion shaft. This thrust is typically configured to propel the watercraft in a direction determined by the position of a marine drive unit. Although the preferred embodiments of the present invention are not limited by the specific type of propulsor used, it is anticipated that the majority of embodiments of the present invention will be in combination with marine propellers or jet drive systems incorporating an impeller. It is expected that the majority of watercraft using the various preferred embodiments of the present invention will comprise sterndrive units and outboard motors that are attached to the transom of a marine vessel, and pod-type drive units which are supported directly below the hull of a marine vessel with the driveshaft axis extending in a generally vertical direction through the hull and connected in torque transmitting relation with an engine that is disposed within the bilge of the watercraft.

Various types of marine transmissions can be used in conjunction with various preferred embodiments of the present invention. These transmissions usually comprise a single forward gear, a single reverse gear, and a neutral gear position. Certain types of marine transmissions, which are very familiar to those skilled in the art of marine propulsion systems, further comprise a dog clutch mechanism that allows the dog clutch to slide in forward and reverse directions parallel to the propulsion shaft to link the propulsion shaft in torque transmitting relation with either a forward or a reverse rotating bevel gear that is driven by a gear attached to a generally vertical driveshaft. It should be understood that the particular configuration of the transmission is not limiting to the present invention and many other different types of transmission can be employed to control the interaction of the various components used to transmit torque from the crankshaft of an engine to the propeller. The primary purpose of the marine transmission which is used in conjunction with the various preferred embodiments of the present invention is to allow the operator of the watercraft to connect the crankshaft of the engine to the propulsion shaft to result in forward and reverse rotation of the propellers.

The step of determining a rotation status of the propulsion shaft can be accomplished in several ways. However, it should be understood that the basic purpose of this step is to decide on whether the propulsion shaft, and the propeller connected to it, is rotating about the propulsion shaft axis or whether it is stationary. A rotating status, in the preferred embodiments of the present invention, indicates that the watercraft is moving or about to begin moving. If the rotation status indicates that the propulsion shaft is not rotating about its axis, the propeller is not providing the thrust which would be likely to cause the watercraft to move. It should not be assumed that, in every embodiment of the present invention, the actual movement or rotation of the propulsion shaft is directly measured or monitored. In many cases, particularly those cases where a microprocessor is used to control the operation of the watercraft, the rotation status of the propulsion shaft can be determined indirectly or inferentially by observing the gear position of the transmission (i.e. forward or reverse) along with the operational status of the engine (i.e. crankshaft turning or engine running). In other applications, observance of certain fluid pressures within the gear case of the drive unit can indicate the rotational condition of the propulsion shaft.

The energy storage device in preferred embodiments of the present invention is disposed for support on the watercraft and configured to receive energy from a first source of energy and a second source of energy. The first source of energy is located on the shore, most probably at a location near where the watercraft is likely to be docked for extended periods of time. The location of the first source of energy can preferably be within a marina or docking area in locations near which the watercraft can logically be expected to remain for several hours or more. Although the first source of energy is expected to be a permanently constructed and stationary source of energy located near the water, it can also be expected that movable sources of energy (e.g. engine driven generators or alternators) could be is provided to allow temporary access to these movable energy sources where permanent and stationary constructions of this type are not available.

The first state of the energy transfer device, as described above, enables or permits energy transfer between the first source of energy and the energy storage device. The second state disables or inhibits energy transfer between the first source of energy and the energy storage device. More simply stated, in most preferred embodiments of the present invention, the first state exists when the appropriate connections and dispositions are made to allow imminent or ongoing transfer of energy from the first source of energy on shore to the energy storage device on the watercraft. The second state represents a condition in which the various components are not currently in an appropriate condition to allow the transfer of energy from the first source of energy on shore to the energy storage device on the watercraft.

In the preferred embodiments of the present invention, one of the steps of the procedure is to determine the state in which the energy transfer device exists. In other words, a test or check is made to determine whether the energy transfer device is in its first state and enabled to transfer energy between the first source of energy and the energy storage device or, alternatively, in the second state and disabled from transferring energy between the first source of energy and the energy storage device. One of the several important functions performed by the preferred embodiments of the present invention is the step of preventing two particular conditions from existing at the same time. One of those conditions is the movement (e.g. rotation) of the propulsion shaft. A second condition is the energy transfer device being in the first state (e.g. prepared to transfer energy from the first energy source to the energy storage device). Stated in general terms, if the energy transfer device is in a condition that indicates that energy is currently being transferred or that energy transfer can be initiated imminently, the rotation of the propulsion shaft should not be allowed to occur. Alternatively stated, if the propulsion shaft is currently rotating or expected to begin to rotate imminently, the energy transfer device should not be allowed to begin transferring energy between the first source of energy and the energy storage device. It is difficult to predict which of the situations can occur first, but the concurrent existence of those two situations is the condition that the preferred embodiments of the present invention seek to prevent.

BRIEF DESCRIPTION OF THE DRAWINGS

The present invention will be more fully and completely understood from a reading of the description of the preferred embodiment in conjunction with the drawings, in which:

FIG. 2 is a basic schematic representation of a marine vessel which identifies certain important components associated with the storage of energy, the provision of energy, and the propulsion of the vessel;

FIG. 3 is an enlarged view of the engine, drive, and transmission shown in FIG. 2;

FIG. 4 is an exploded view that schematically represents the various interconnections and interrelationships of various components associated with a flywheel storage of energy on a marine vessel;

FIG. 5 shows an assembled version of the system shown in FIG. 4;

FIG. 6 shows the transmission of a drive unit such as that which is illustrated in FIG. 3;

FIGS. 8 and 9 are tables identifying certain conditions relating to the operative status of the engine and the position of the transmission in various embodiments of the present invention.

DESCRIPTION OF THE PREFERRED EMBODIMENT

Figure 1:
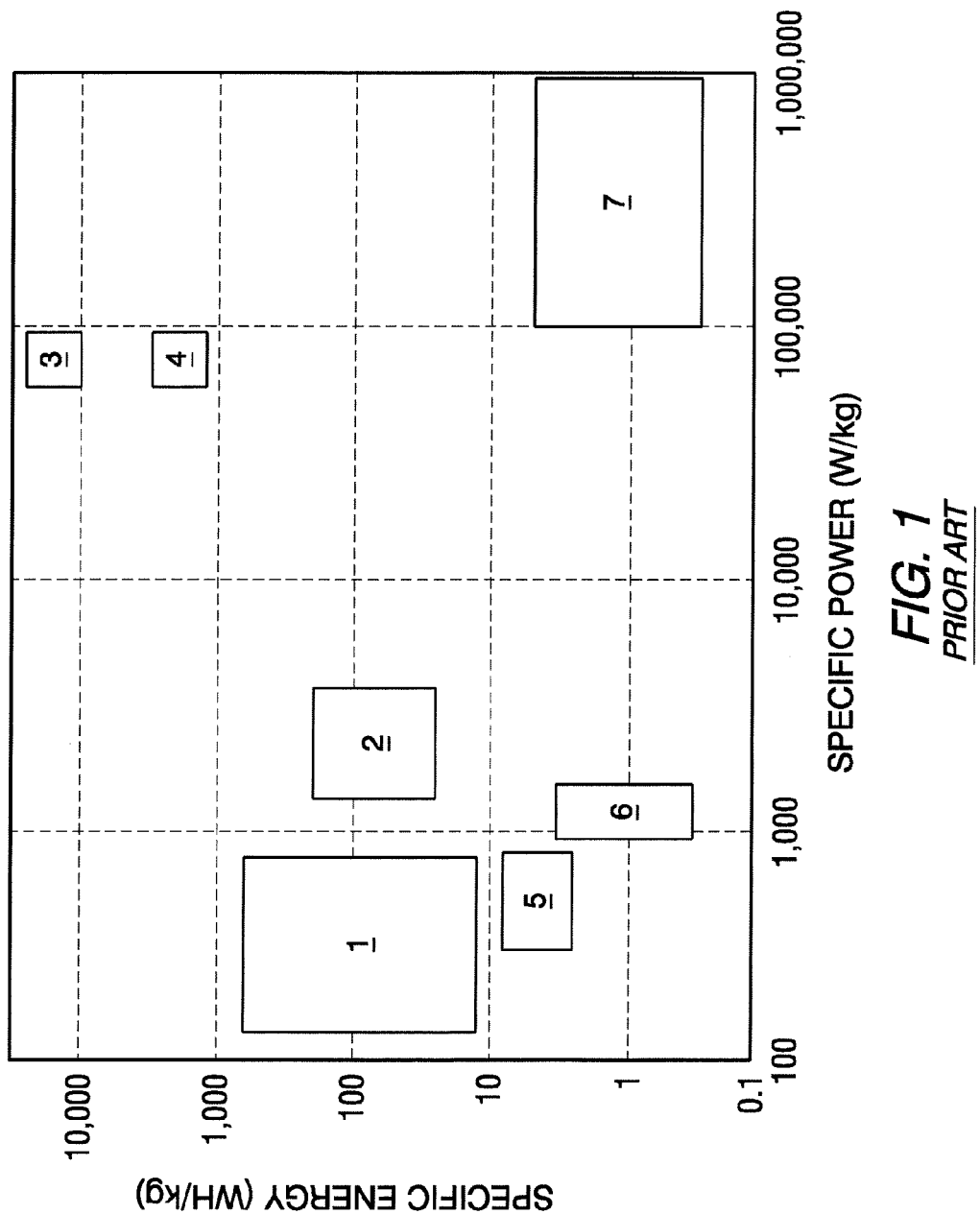
FIG. 1 is a graphical representation of various energy storage media in order to compare their relative specific energy and specific power characteristics.

Throughout the description of the preferred embodiment of the present invention, like components will be identified by like reference numerals.

Recent developments of energy efficient vehicles have led to the development of several commercially viable energy storage systems that are being provided for hybrid electric vehicles (HEV's). The technical advances relating to this field have proceeded at such a pace that it is extremely difficult to predict the type of energy storage device that will be used in any particular hybrid watercraft. As described in the website of the College of Engineering of San Diego State University, potential energy storage devices must be reviewed and analyzed based on their specific energy and specific power. This information is available on the Internet at http://www.engineering.sdsu.edu/~hev/energy.html along with interesting and educational graphs, charts, and descriptive text. At this time, the types of energy storage devices that appear to be promising are batteries, flywheels, and ultracapacitors. As described in the website of the College of Engineering at San Diego State University, entitled "Energy Storage", both gasoline and hydrogen have a higher specific energy than the rest of the electrical storage devices. An advantage of HEV's is that they can use the high specific energy of liquid or gaseous fuels to provide the vehicle with long-range capabilities. Conversely, the HEV can use the high specific power of electrical energy storage to provide the peak power requirements. While many of those skilled in the art of marine propulsion systems and hybrid vehicles tend to consider the battery as being relatively easy to apply in vehicles and as being commercially available, other energy storage devices should also be considered, particularly when developing hybrid marine vessels. The use of rechargeable batteries in a hybrid marine vessel introduces certain important considerations that must be carefully analyzed. Storage batteries are direct current devices and hybrid vehicles typically require relatively high voltages (e.g. approximately 300 VDC). It should not always be assumed that rechargeable storage batteries are the only choice when a hybrid marine vessel is being developed.

FIG. 1 is a graphical comparison of electrical power and energy storage of various devices and systems. It should be clearly understood that the boxes shown on the graph of FIG. 1 are intended to imply an approximate and not a precise magnitude of the specific energy and specific power by the sizes and shapes of the boxes and the positions of their edges. FIG. 1 is intended solely to represent the relative positions of various types of energy storage media on the graph as a function of the specific energy and specific power of each of the types of storage systems. As an example, the box identified by reference numeral 1 represents the relative position of batteries as determined by the relative specific energy and relative specific power of rechargeable batteries that are available at this time. Also shown in comparison to batteries, are flywheels 2, gasoline 3, hydrogen 4, the Department of Energy (DOE) target for ultracapacitors 5, projected carbon capacitors 6, and projected metal oxide capacitors 7.

The information represented graphically in FIG. 1 is intended to demonstrate that alternative choices are available as energy storage devices and systems other than the most commonly selected storage batteries 1. This description of the preferred embodiment, as it will be described in greater detail below, does not intend to suggest that one storage media is better than any other. However, the selection of an energy storage system for a hybrid marine vessel requires that all potential devices be considered.

Regardless of the specific selection of an energy storage device, certain problems will likely exist with the overall system and must be considered and solved in order to provide a robust and safe marine vessel that is capable of utilizing various sources of energy and storing energy for periods of time that are long enough to justify structure and use of the hybrid marine vessel.

FIG. 2 is intended to illustrate certain basic elements and components of a hybrid marine vessel so that the goals and methods of the present invention can be described in these basic terms before the much more specific embodiments are later illustrated and described. FIG. 2 is a basic schematic representation showing a watercraft 10 that is positioned near a shoreline 12 that separates a body of water 14 from land 16. In other words, FIG. 2 illustrates a marine vessel 10 located next to the shoreline 12 such as would be the case if the watercraft 10 is located in a marina or next to a pier or dock. This is a typical docked position for a boat. On the marine vessel 10, an energy storage device 20 is provided and disposed for movement with the boat. A first source of energy 30, which is illustrated as a stationary energy source located on shore in FIG. 2, is provided so that it can supply energy to various systems on the watercraft 10. For example, a charging system 40 can received energy from the first source of energy 30 and provide that energy in an acceptable form to the energy storage device 20. Depending on the specific type of energy being described, the charging system 40 can be of various designs. As an example, as will be described in detail below, if a flywheel is used to store energy and fulfill the purpose of the energy storage device 20, the charging system 40 can comprise a plurality of gears and shafts that allow energy to be transmitted from the stationary energy source 30 to the flywheel 20. Alternatively, if the energy storage device 20 comprises a plurality of rechargeable storage batteries 20, the charging system 40 could comprise the necessary circuitry to perform the rectification and regulation which appropriately converts alternating current power received from the stationary energy source 30 to DC power transmitted to the energy storage device 20. In that case, the stationary energy source 30 would comprise an AC outlet located on shore 16. Block arrow A represents the transfer of energy, regardless of the form of this device or system. Block arrow C, which is illustrated as a bidirectional transfer of energy, illustrates the provision of energy from the charging system 40 to the energy storage device 20 and vice-versa. The bidirectional block arrow B represents the fact that energy can be provided from the charging system 40 to engine 50 for its use, particularly if the engine 50 is a non-traditional type of prime mover.

With continued reference to FIG. 2, the engine 50 is physically supported by the watercraft 10 and, in most preferred embodiments of the present invention, provides torque to a shaft 62 which, in turn, transmits torque to a marine drive unit 60. As described above, FIG. 2 is intended to illustrate a very basic and conceptual representation of a watercraft 10 with an energy storage device 20 that can receive energy from a first source of energy 30. It is anticipated that most applications of the present invention will use a stationary system located on shore 16 to be the first source of energy 30. However, this is not necessary in all cases since a portable first energy source can remain on shore 16 and be movable to various locations where boats are moored.

FIG. 3 illustrates a larger and more detailed representation of the engine 50 and marine drive 60. The engine 50 is illustrated as being connected to a transmission 80 which, in turn, is connected to the propulsor 70 that is typically attached to the propulsion shaft 72. As is generally known by those skilled in the art of marine propulsion systems, a marine transmission 80 typically incorporates a pair of bevel gears, 81 and 82, that transmit torque from a generally horizontal shaft 62 (e.g. a driveshaft attached to the crankshaft of the engine 50), to a generally vertical driveshaft 83. It should be understood that alternative configurations are available to transmit torque from the crankshaft of the engine 50 to the propulsor 70, but the transmission 80 shown in FIG. 3 is representative of a large number of those marine propulsion systems.

With continued reference to FIG. 3, it should be understood that the system illustrated is shown in a very basic form and does not illustrate all of the specific details that are well known to those skilled in the art. Shown at the bottom portion of the transmission 80, a bevel gear 84 spins in synchrony with the generally vertical driveshaft 83 and continuously causes gears 85 and 86 to rotate in opposite directions to each other. Not shown in FIG. 3 is a dog clutch mechanism which is used to select which of the two gears, 85 or 86, will be connected in torque transmitting relation with the propulsion shaft 72 at any particular time or, alternatively, whether the dog clutch will place the transmission 80 in a neutral gear position so that the propulsion shaft 72 does not receive torque from the engine 50. These details are not necessary in order to understand the present invention and those skilled in the art of marine propulsion systems are very much aware of how the dog clutch and other gears work in a marine transmission 80 and, also, that alternative types of transmissions can also be used. The propulsion shaft 72 is supported for rotation about a generally horizontal axis and to the propulsor 70 is attached to the propulsion shaft 72. As described above, the propulsor 72 can be a marine propeller, an impeller from a jet drive system, or a pair or propellers that are counter rotating and cooperative to provide torque through the structure of a pod drive.

The illustration of the drive 60 in FIG. 2 represents a typical situation in which the drive 60 comprises the gearing shown in the dashed box 80 of FIG. 3, the propulsion shaft 72, and the propulsor 70. As described above, an alternative marine propulsion system could implement a driveshaft 83 that extends downwardly through the hull of the marine vessel 10 to a pod structure that is configured to be supported below the marine vessel and to support a propulsion shaft 72 and a pair of propellers that are counter rotating and configured to provide the thrust described throughout this description.

FIG. 4 shows an exploded view of particular type of marine propulsion and energy storage system in which the watercraft 10 is provided with an energy storage device 20 that comprises a flywheel 22 that stores energy, in a kinetic form, by the rotation of the flywheel 22. The illustration in FIG. 4 shows an exploded view in which the first energy source 30 is actually a device that is configured to cause a shaft 31 to rotate and provide kinetic energy that is adapted for use by the energy storage device 20 and, more particularly, by its flywheel 22. Looking at FIGS. 2 and 4 analogously, the first source of energy 30 in FIG. 2 is the device that causes shaft 31 to rotate in FIG. 4 and the device 43 shown in FIG. 4 is basically represented as a component that simply receives torque by shaft 45 from shaft 31 and provides that torque on shaft 47 to the energy storage device 20 by causing its flywheel 22 to rotate. Dashed line box arrow 42 is intended to show where the system 40 would be located when the device is assembled and the component identified by reference numeral 32 is used as a transition shaft to connect the first source of energy 30 to the "charging system" 40 when they are both installed in their functional positions.

FIG. 5 shows the components of FIG. 4 after they are all assembled in place. When energy is being provided to the flywheel 62, the first source of energy 30 causes shaft 31 to rotate. The transitional member 32 connects shaft 31 to shaft 45 which, in turn, transmits that torque at a 90 degree angle to shaft 47 which rotates the flywheel 22. In this manner, a source of torque, or kinetic energy, is used to spin up the flywheel 22 and thereby store the energy as kinetic energy maintained by the rotating flywheel 22.

With continued reference to FIG. 5, a gear box 24 is also shown and intended to represent the fact that the engine 50 can be used to provide the kinetic energy necessary to increase the stored energy of the energy storage device 20. In other words, when the engine 50 is operating, a power take off (PTO) shaft 51 can be used to provide torque to shaft 29 which, in turn, provides kinetic energy to increase the rotational speed of the flywheel 22.

FIG. 6 illustrates the transmission that was described above in conjunction with FIG. 3, but without the engine 50 and propulsor 70. It should be understood that many types of transmission can be used in conjunction with the present invention but, although the specific details are not limiting to the present invention, the transmission 80 should provide at least a single forward gear, a single reverse gear, and a neutral gear position. The precise structure and configuration of the gear positions need not be in any specific form, but it is typical that a neutral gear position is available for use in which the engine 50 is operating, but torque is not provided to the propulsor 70.

Figure 7:
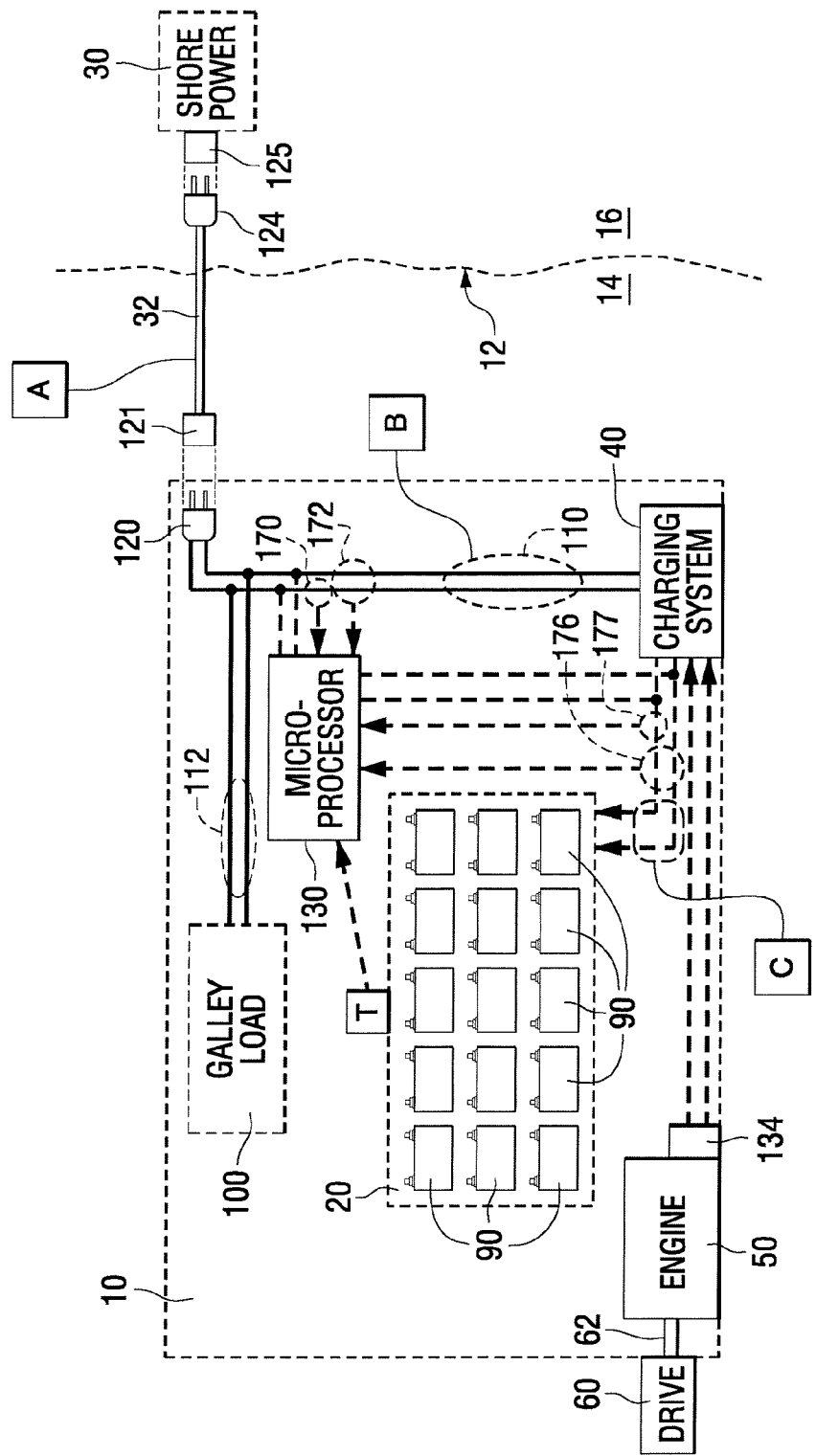
FIG. 7 shows a version of a marine vessel which incorporates the principles of the present invention in conjunction with rechargeable batteries.

FIG. 7 is a schematic representation of a marine vessel which is made in accordance with a preferred embodiment of the present invention and incorporates a rechargeable battery of the type that those skilled in the art are familiar with and which is commercially available. In FIG. 7, the reference numerals introduced in FIG. 2 are maintained to a large degree, but certain other reference numerals are introduced in order to more specifically make FIG. 7 relevant to a marine propulsion system that utilizes electrical energy which is stored by the energy storage device 20 and conveyed from the first energy source 30. The analogies between FIGS. 2 and 7 should be apparent to those skilled in the art of marine propulsion systems and, more specifically, to those who are familiar with hybrid marine propulsion systems.

In FIG. 7, the watercraft 10 is provided with an energy storage device 20 that comprises a plurality of rechargeable batteries 90. The rechargeable batteries 90 can be of any one of various types and can employ any of the available technologies that are currently being developed and becoming commercially available. The engine, driveshaft 62, and marine drive 60 are generally similar to the components of a similar nature described above. The first energy source 30 is illustrated as a dashed line box which represents a shore power component. Typically, this would be an AC electric energy source with an electrical receptacle 125 configured to receive a male plug 124 as illustrated in FIG. 7. The opposite end of the cable 32 is a female receptacle identified by reference numeral 121. It is configured to receive a male receptacle 120 to connect the system of the watercraft 10 to the first source of energy 30. It can be seen that in FIG. 7 the reference letter A is used to identify the energy transfer device which is also identified above in FIG. 2 by reference letter A and described in conjunction with FIG. 4 as the shaft and gears that are identified by reference numeral 32. It can be seen that, functionally, this device allows transfer of energy from a source of shore power to the energy storage device 20 through a charging system 40 regardless of whether the device is a shaft with two gears as identified by reference numeral 32 in FIG. 4 or a cable 32 as illustrated in FIG. 7. The charging system 40 in FIG. 7 would typically comprise a rectifier circuit and a regulation circuit that, together, are configured to provide regulated DC power to the batteries 90 in order to implement their recharging. In addition, an alternator 134, or generator, can be driven by the engine 50 to provide power (e.g. as a second source of energy) to the charging system 40 that can, in turn, be use to charge the batteries 90. Reference letter B in FIG. 7 is used to identify the electrical connections (which are also is identified by reference numeral 110) between the male receptacle 120 and the charging system 40. Alternating current power would be evident on these lines 110, particularly when the cable 32 is connected between plug 120 and receptacle 125 of the shore power station.

With continued reference to FIG. 7, it can also be seen that a galley load 100 is illustrated to represent the fact that the power obtained from the first source of energy 30 can be used to simultaneously power the various galley loads of the watercraft 10, such as the lighting, instrumentation, and air conditioning of the boat. When the watercraft 10 is connected to shore power 30, numerous things can occur simultaneously. Power can be provided at the male plug 120 for use by the galley load 100, for use by the charging system 40, to recharge the batteries 90, to operate the microprocessor 130, and for any other use in which electrical power is needed. It should be noted that the type of system illustrated in FIG. 7 can charge the batteries 90 with power received from the first source of energy 30, which is rectified and regulated by the charging system 40 prior to being transmitted to the energy storage device 20, while additional power is provided by the alternator 134, or generator, driven by the engine 50 which also provides AC power to the charging system 40 that is, in turn, also rectified and regulated for use by the energy storage device 20 which, in this case, comprises a plurality of batteries 90. As a result, the energy storage device 20 can be charged at an increased rate because of the use of two sources of power, the shore power 30 and the second source of energy which is the alternator 134 that is driven by the engine 50.

With continued reference to FIG. 7, the microprocessor 130 is illustrated with several dashed line circles and arrows representing the monitoring of various values and magnitudes associated with the system. As an example, dashed line circles 170 and 712 represent the fact that the microprocessor 130 can monitor the current flowing in lines 110 and the voltage associated with the male plug 120, charging system 40 and galley load 100. The information gained, by the microprocessor 130, from the monitoring of the electrical connection between male plug 120 and the charging system 40 can yield information which is sufficient to allow a decision to be made as to whether or not the plug 120 is connected, through cable 32, to the first source of energy 30. It is recognized that a disconnection between components 120 and 121 would typically result in the same sensed magnitudes as a disconnection between components 124 and 125. The microprocessor 130 is also shown as being connected to monitor the electrical connections between the charging system 40 and the energy storage device 20 which comprises a plurality of batteries 90. These monitors are identified by dashed line circles 176 and 177. These are intended to represent the monitoring of voltages and currents in these lines by the microprocessor 130. When the batteries are being recharged, the microprocessor 130 has several ways to detect this condition. Current flow from the charging system 40 to the batteries 90 represents one way. The voltage and current magnitudes associated with the charging system 40 and the male plug 120 also provide information of this type. The sensors identified by dashed line circles 170, 172, 176, and 177 can also provide sufficient information for the microprocessor 130 to determine that the batteries 90 are being recharged.

Another way in which the microprocessor 130 can determine that the batteries 90 are being recharged is simply to monitor a status flag and maintain that flag in an indicative state because, in most case, the operator of the marine vessel 10 first requests that the batteries 90 be recharged. Therefore, the microprocessor can set the flag when requested to perform the tasks associated with recharging the energy storage device 20 and clear the flag when the operator of the watercraft 10 decides to end the recharging process. In addition, the various sensors used by the microprocessor 130 allow the specific voltages and currents to be monitored and, from that information, a logical decision can be made that the batteries 90 are being recharged. Therefore, there are numerous ways in which the microprocessor 130 can determine whether or not the energy storage device 20 is actively in the process of being recharged. In addition, various types of switches can be associated with the sockets (e.g. male plug 120) to indicate that it is connected or disconnected with receptacle 121. In addition, in certain embodiments of the present invention, the cable 32 can be provided with two connections, which are similar to those identified by reference numerals 120 and 125, that are located on the marine vessel 10, but do not perform any service other than maintain the positions of the cable ends and identify the presence of the cable 32 attached at two locations at its ends. This is a positive way of ascertaining that the cable 32 is stowed properly and not connected to male plug 120 and receptacle 125. In other words, there are many ways for the microprocessor 130 to determine that the cable 32 is either in the process of charging the batteries 90 or preparing to charge the batteries or, alternatively, is disabled from performing that charging task. One of the steps of the method of the present invention, in a preferred embodiment, is providing an energy transfer device (i.e. a system analogous to the cable 32 shown in FIG. 7 or the mechanical connection 32 shown in FIG. 5) which is alternatively placed into first and second states, wherein the first state enables energy transfer between the first source of energy 30 and the energy storage device 20 and the second state disables energy transfer between the first source of energy and the energy storage device. This allows the present invention to know whether or not the cable 32, if the system is electric and involves recharging batteries, is connected between plug 120 and receptacle 125 or is safely stowed on board in a manner that would allow the watercraft 10 to be operated in a way that might result in its moving relative to the source of shore power or, as described above, the first source of energy 30. A convenient way to make this determination is to inhibit or permit the transmission 80 to be placed in forward or reverse gear, if the engine 50 is operating, only if the energy transfer device 32 is properly stowed. Certain known systems use switches associated with the actual physical connection between the energy transfer device and a receptacle on the boat to make this determination. That technique can be used in association with the present invention along with many other systems such as those described above. The use of a logical flag by the microprocessor 130 is a viable technique to perform this function. Also, the information gathered from the sensing locations 170, 172, 176, and 177 can also provide this information. Since the microprocessor 130 measures temperature, as indicated by the temperature sensor T in FIG. 7 and numerous voltage and current locations, it is well within the functions of the microprocessor 130 to make the determination regarding the stowed or active position of the cable 32 or other energy transfer devices as described above.

With continued reference to FIGS. 2-7, it can be seen that a method for operating a propulsion system of a watercraft, according to various preferred embodiments of the present invention, comprise the steps of providing an engine 50 having a rotatable crankshaft, providing a propulsion shaft 72 which is configured to support a propulsor 70 for rotation about a generally horizontal propulsion shaft axis, providing a water impervious containment 10 which is configured to provide at least a portion of the watercraft and is shaped to define one or more internal cavities of sufficient total displacement to support the watercraft on a body of water. The water impervious containment has an outer surface which is disposable on the body of water and the plurality of blades is shaped to provide thrust when the propulsor is rotated within water of the body of water. The method further comprises the steps of providing a transmission which comprises forward, neutral, and reverse gear positions and disposing the transmission in torque transmitting relation between the crankshaft of the engine and the propulsion shaft. The method further comprises the steps of determining a rotation status of the propulsion shaft, providing an energy storage device, providing an energy transfer device which is alternatively placed into first and second states, determining the state of the energy transfer device, and inhibiting the concurrent rotation of the propulsion shaft and placement of the energy transfer device in the first state.

FIGS. 8 and 9 show two logic tables which describe the relationship between the transmission and engine operating status with regard to the status of the energy transfer device. With reference to FIG. 8, if the status of the energy transfer device 20 indicates that the charging of the batteries 90 is currently occurring or about to begin, the preferred embodiments of the present invention will allow or inhibit the transmission to be moved into certain gear positions. For example, if the engine is off in the situation represented by FIG. 8, the transmission will be permitted to be switched into either neutral, forward gear position or reverse gear position. However, the bottom row of the table in FIG. 8 shows that if the engine is operating, the transmission will only be allowed to be placed in the neutral gear position. Forward gear and reverse gear are prohibited. The sequence of events will determine the actions taken by the various embodiments of the present invention. For example, if the engine is turned off and the transmission is placed in either forward or reverse gear, the engine will not be subsequently allowed to be turned on. If the engine is already in an operative condition and in neutral gear position, the transmission will not be permitted to move from the neutral gear position into either a forward or reverse gear position. Also, with continued reference to FIG. 8, if the energy transfer device is sensed as being in a stowed and safe condition with the engine on and the transmission in either a forward or reverse gear position, the energy transfer device will not subsequently be allowed to be connected in a recharging position until the transmission is changed to place it in a neutral gear position or, alternatively, if the engine is deactivated.

FIG. 9 is generally similar to FIG. 8 except it follows a stricter regimen. In the system constructed according to FIG. 9, the transmission is prohibited from being placed in forward or reverse gear positions if the energy transfer device is in a recharge condition (e.g. not properly stowed) regardless of whether the engine is on or off.

Figure 10:
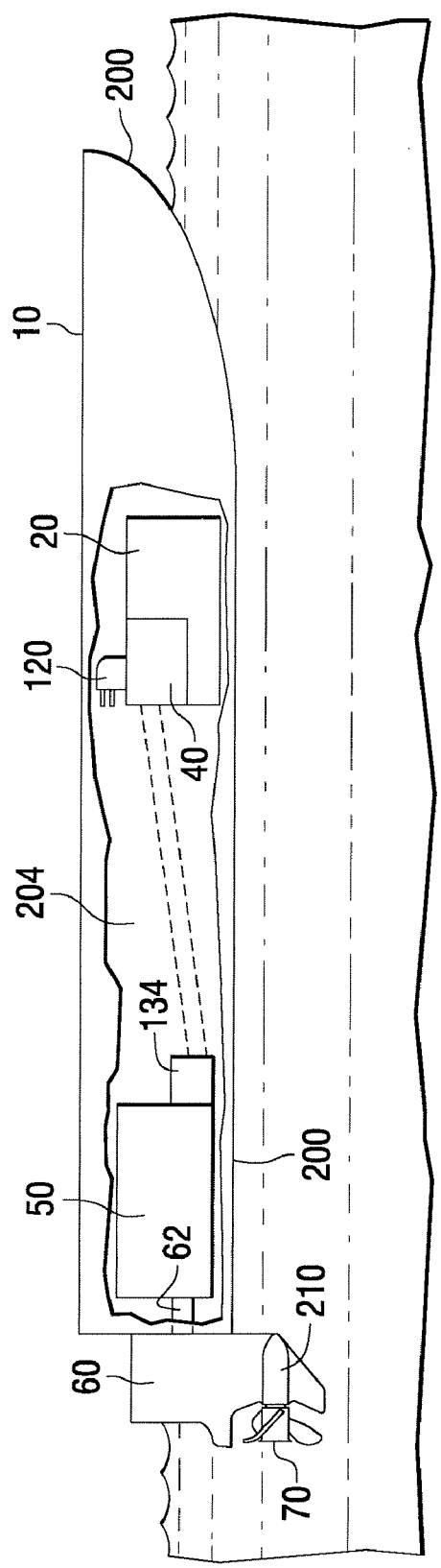
FIG. 10 is as simplified representation illustrating a hybrid vehicle made in accordance with the present invention in which a water impervious containment provides a hull structure.

One of the steps of the method in preferred embodiments of the present invention relates to providing a water impervious containment 200 such as that shown in FIG. 10. The water impervious containment 200 is shaped to define at least one internal cavity 204 that defines a bilge portion of the watercraft. The engine 50 is disposed within the bilge portion in certain embodiments of the present invention. In FIG. 10, the engine 50 is shown with an alternator 134 which can be configured to provide electrical power on lines connecting it to the charging system 40. The charging system 40 is also shown with a male plug 120 schematically illustrated to represent the fact that the cable 32 can be extended to the position of the plug 120 during the recharging procedure associated with the batteries 90 of the energy storage device 20 as described above in conjunction with FIGS. 2 and 7. It should be understood that the precise positions and locations of the components within the watercraft 10 are not limiting to the present invention. In FIG. 10, the marine drive 60 is of the type that is generally referred to as a sterndrive system and the propulsor 70 is supported at the rear portion of the gear case 210. As described above, the alternative types of marine propulsion systems could include outboard motors, ski boat arrangements, or pod-type systems that support the pod below the marine vessel.

With continued reference to FIG. 10, it can be seen that the total displacement of the water impervious containment, which provides the hull and internal bilge cavities, is sufficient to provide vertical support for the engine 50, the transmission within the drive structure 60, and the energy storage device 20 which can comprise a plurality of batteries 90 as described above.

Although the present invention has been described with particular detail and illustrated to show several preferred embodiments, it should be understood that alternative embodiments are also within its scope.

I claim:

1. A method for operating a propulsion system of a watercraft, comprising the steps of:
providing an engine having a rotatable crankshaft;
providing a propulsion shaft which is configured to support a propulsor for rotation about a generally horizontal propulsion shaft axis, said propulsor comprising a plurality of blades which are configured to provide a thrust which is parallel to said propulsion shaft axis in response to rotation of said propulsor about said propulsion shaft axis;
providing a water impervious containment which is configured to provide at least a portion of said watercraft and is shaped to define one or more internal cavities of sufficient total displacement to support said watercraft on a body of water, said water impervious containment having an outer surface which is disposable on said body of water, said plurality of blades being shaped to provide thrust when said propulsor is rotated within water of said body of water;
providing a transmission which comprises forward, neutral, and reverse gear positions;
disposing said transmission in torque transmitting relation between said crankshaft of said engine and said propulsion shaft, said transmission being configured to cause said propulsion shaft to rotate in a forward direction when said transmission is placed in said forward gear position when said engine is operating, said transmission being configured to cause said propulsion shaft to rotate in a reverse direction when said transmission is placed in said reverse gear position when said engine is operating;
determining a rotation status of said propulsion shaft;
providing an energy storage device, said energy storage device being disposed for support on said watercraft and configured to receive energy from a first source of energy, said first source of energy being located on shore;
providing an energy transfer device which is alternatively placed into first and second states, said first state enabling energy transfer between said first source of energy and said energy storage device, said second state disabling energy transfer between said first source of energy and said energy storage device, said total displacement of said water impervious containment being sufficient to provide support for said engine, said transmission, and said energy storage device;
determining the state of said energy transfer device; and
inhibiting the concurrent rotation of said propulsion shaft and placement of said energy transfer device in said first state.

2. The method of claim 1, wherein:
said inhibiting step comprises the step of preventing said transmission from being moved into either said forward gear position or said reverse gear position when said crankshaft is rotating and said energy transfer device is in said first state.

3. The method of claim 1, wherein:
said inhibiting step comprises the step of preventing said energy transfer device from being placed in said first state when said propulsion shaft is rotating.

4. The method of claim 1, wherein:
said inhibiting step comprises the step of preventing said energy transfer device from being placed in said first state when said transmission is in either said forward gear position or said reverse gear position.

5. The method of claim 1, wherein:
said energy storage device is configured to receive energy from a second source of energy.

6. The method of claim 1, further comprising:
enabling rotation of said crankshaft when said energy transfer device is in said first state and said transmission is in said neutral gear position.

7. The method of claim 1, further comprising:
placing said transmission in said neutral gear position;
placing said energy transfer device in said second state;
connecting said engine to said energy storage device and operating said engine to transfer energy from said engine to said energy storage device such that said engine acts as said second source of energy.

8. The method of claim 1, further comprising:
placing said transmission in said neutral gear position;
placing said energy transfer device in said first state and transferring energy from said first source of energy to said energy storage device;
connecting said engine to said energy storage device and operating said engine to transfer energy from said engine to said energy storage device such that said engine acts as said second source of energy, whereby said energy storage device concurrently receives energy from both said first source of energy and said second source of energy.

9. The method of claim 1, wherein:
said energy storage device comprises a rechargeable battery and said first source of energy comprises an AC receptacle; and
said energy transfer device comprises an electrically conductive cable which is connectable in electrical communication between said first source of energy on said shore and a recharging circuit which is connected in electrical communication with said rechargeable battery.

10. The method of claim 1, further comprising:
transmitting an alarm signal in response to an attempt to (a) cause said propulsion shaft to rotate when said energy transfer device is in said first state or (b) place said energy transfer device in said first state when said transmission is in either said forward gear position or said reverse gear position.

11. A method for operating a propulsion system of a watercraft, comprising the steps of:
providing an engine having a rotatable crankshaft;
providing a propeller shaft which is configured to support a propeller for rotation about a propeller shaft axis, said propeller comprising a plurality of blades which are configured to exert a thrust on said watercraft in response to rotation of said propeller about said propeller shaft axis;
providing a transmission which comprises forward, neutral, and reverse gear positions;
disposing said transmission in selectable torque transmitting relation between said crankshaft of said engine and said propeller shaft, said transmission being configured to cause said propeller shaft to rotate in a forward direction when said transmission is placed in said forward gear position and said engine is operating, said transmission being configured to cause said propeller shaft to rotate in a reverse direction when said transmission is placed in said reverse gear position and said engine is operating;
determining a rotational status of said propeller shaft;
providing a rechargeable battery system, said rechargeable battery system being disposed for support on said watercraft and configured to receive energy from a first source of energy and to receive energy from a second source of energy, said first source of energy being located on shore;
providing an electrically conductive cable which is alternatively placed into first and second states, said first state enabling energy transfer between said first source of energy and said rechargeable battery system, said second state disabling energy transfer between said first source of energy and said rechargeable battery system;
determining the state of said electrically conductive cable; and
inhibiting the concurrent rotation of said propeller shaft and placement of said electrically conductive cable in said first state.

12. The method of claim 11, wherein:
said rechargeable battery system comprises a rechargeable battery system and said first source of energy comprises an AC receptacle.

13. The method of claim 12, wherein:
said inhibiting step comprises a step selected from the group consisting of (a) preventing said transmission from being moved into either said forward gear position or said reverse gear position when said crankshaft is rotating and said electrically conductive cable is in said first state, (b) preventing said electrically conductive cable from being placed in said first state when said propeller shaft is rotating, and (c) preventing said electrically conductive cable from being placed in said first state when said transmission is in either said forward gear position or said reverse gear position.

14. The method of claim 11, further comprising:
enabling rotation of said crankshaft when said electrically conductive cable is in said first state and said transmission is in said neutral gear position.

15. The method of claim 11, further comprising:
placing said transmission in said neutral gear position;
placing said electrically conductive cable in said first state and transferring energy from said first source of energy to said rechargeable battery system;
connecting said engine to said rechargeable battery system and operating said engine to transfer energy from said engine to said rechargeable battery system such that said engine acts as said second source of energy, whereby said rechargeable battery system concurrently receives energy from both said first source of energy and said second source of energy.

16. The method of claim 11, further comprising:
transmitting an alarm signal in response to an attempt to (a) cause said propeller shaft to rotate when said electrically conductive cable is in said first state or (b) place said electrically conductive cable in said first state when said transmission is in either said forward gear position or said reverse gear position.

17. A method for operating a propulsion system of a watercraft, comprising the steps of:
providing an engine having a rotatable crankshaft;
providing a propeller shaft which is configured to support a propeller for rotation about a propeller shaft axis, said propeller comprising a plurality of blades which are configured to exert a thrust on said watercraft in response to rotation of said propeller about said propeller shaft axis;
providing a transmission which comprises forward, neutral, and reverse gear positions;
disposing said transmission in selectable torque transmitting relation between said crankshaft of said engine and said propeller shaft, said transmission being configured to cause said propeller shaft to rotate in a forward direction when said transmission is placed in said forward gear position and said engine is operating, said transmission being configured to cause said propeller shaft to rotate in a reverse direction when said transmission is placed in said reverse gear position and said engine is operating;
determining a rotational status of said propeller shaft;
providing a rechargeable battery system, said rechargeable battery system being disposed for support on said watercraft and configured to receive energy from a first source of energy and to receive energy from a second source of energy, said first source of energy being located on shore;

providing an electrically conductive cable which is alternatively placed into first and second states, said first state enabling energy transfer between said first source of energy and said rechargeable battery system, said second state disabling energy transfer between said first source of energy and said rechargeable battery system;

determining the state of said electrically conductive cable;

inhibiting the concurrent rotation of said propeller shaft and placement of said electrically conductive cable in said first state;

enabling rotation of said crankshaft when said electrically conductive cable is in said first state and said transmission is in said neutral gear position; and transmitting an alarm signal in response to an attempt to (a) cause said propeller shaft to rotate when said electrically conductive cable is in said first state or (b) place said electrically conductive cable in said first state when said transmission is in either said forward gear position or said reverse gear position.

18. The method of claim 17, wherein:

said inhibiting step comprises a step selected from the group consisting of (a) preventing said transmission from being moved into either said forward gear position or said reverse gear position when said crankshaft is rotating and said electrically conductive cable is in said first state, (b) preventing said electrically conductive cable from being placed in said first state when said propeller shaft is rotating, and (c) preventing said electrically conductive cable from being placed in said first state when said transmission is in either said forward gear position or said reverse gear position.

19. The method of claim 18, further comprising:

placing said transmission in said neutral gear position;

placing said electrically conductive cable in said first state and transferring energy from said first source of energy to said rechargeable battery system;

connecting said engine to said rechargeable battery system and operating said engine to transfer energy from said engine to said rechargeable battery system such that said engine acts as said second source of energy, whereby said rechargeable battery system concurrently receives energy from both said first source of energy and said second source of energy.

20. The method of claim 19, wherein:

said rechargeable battery system comprising a rechargeable battery system and said first source of energy comprises an AC receptacle.

* * * * *